US005702733A

United States Patent [19]

Enami

[11] Patent Number: 5,702,733

[45] Date of Patent: Dec. 30, 1997

[54] PRESS WORKING MACHINE

[75] Inventor: Toshiaki Enami, Kyoto, Japan

[73] Assignee: Enami Seiki Mfg. Co., Ltd., Yao, Japan

[21] Appl. No.: 631,669

[22] Filed: Apr. 9, 1996

[30] Foreign Application Priority Data

May 24, 1995 [JP] Japan .................................... 7-125161

[51] Int. Cl.[6] ..................................................... B29C 43/04

[52] U.S. Cl. .......................... 425/183; 264/313; 264/320; 425/394; 425/403; 425/DIG. 30

[58] Field of Search .................................... 425/183, 185, 425/193, 394, 395, 403, DIG. 30; 249/155; 264/320, 322, 313

[56] References Cited

U.S. PATENT DOCUMENTS

| | | | |
|---|---|---|---|
| 3,171,163 | 3/1965 | Ford et al. | 425/DIG. 30 |
| 4,447,372 | 5/1984 | Kreuttner . | |
| 5,009,098 | 4/1991 | van Merksteijn . | |
| 5,151,277 | 9/1992 | Bernardon et al. | 425/394 |
| 5,192,560 | 3/1993 | Umetsu et al. | 425/395 |
| 5,330,343 | 7/1994 | Berteau | 249/155 |
| 5,513,972 | 5/1996 | Schroeder et al. | 249/155 |
| 5,546,313 | 8/1996 | Masters | 249/155 |

FOREIGN PATENT DOCUMENTS

| | | |
|---|---|---|
| 0404269 | 12/1990 | European Pat. Off. . |
| 2116550 | 5/1990 | Japan . |
| 2118466 | 11/1983 | United Kingdom . |

*Primary Examiner*—Jay H. Woo
*Assistant Examiner*—Joseph Leyson
*Attorney, Agent, or Firm*—W. G. Fasse; W. F. Fasse

[57] ABSTRACT

A press working machine includes base members having concave portions, slider members arranged in the concave portions, link arms attached to first ends of the slider members respectively, and cylinders attached to the arms, for bending and extending the same. Furthermore, press members having curved mold-facing surfaces are arranged on the slider members. Molds having deformable structures are arranged on the press members. A workpiece is inserted between the molds, to be press-worked. The slider members are actuatable to press the press members against the molds, so as to deform the molds into different mold shapes. Thus, it is possible to press-mold workpieces into a plurality of shapes with a single mold assembly, thereby reducing the cost for manufacturing the mold assembly, omitting an operation of exchanging the mold assembly, and reducing the manufacturing cost.

20 Claims, 5 Drawing Sheets

PRESS WORKING MACHINE

BACKGROUND OF THE INVENTION

1. Field of the Invention

The present invention relates to a press working machine, and more particularly, it relates to a press working machine which can press-work workpieces into various shapes with a single mold by employing a deformable mold and varying the shape of its working surface.

2. Description of the Background Art

Various types of press working machines are known in general. In a typical press working machine, a particular mold is selected in response to the desired shape of a product that is to be formed, the mold is mounted in the press working machine and is pressed against a workpiece, for deforming the workpiece into a desired shape.

In general, the mold which is employed in the aforementioned press working machine is not deformed itself. Namely, a technical idea of deforming the mold itself for press-working a workpiece has not been common sense in general. Every time the shape of the product is changed, therefore, a new mold is formed in response thereto.

Since it is necessary to newly form a mold every time the shape of the product is changed as described above, the cost for manufacturing such molds is increased if various types of products having different shapes are manufactured. Further, the manufacturing steps are complicated since it is necessary to exchange the mold every time the shape of the product is changed. Consequently, the manufacturing cost is increased.

SUMMARY OF THE INVENTION

The present invention has been proposed in order to solve the aforementioned problems. An object of the present invention is to provide a press working machine which can reduce the manufacturing cost by employing a deformable mold.

The press working machine according to the present invention comprises a press member, a base, and a driving mechanism. Further, the press working machine according to the present invention is adapted to use a mold having a working surface for press-working a workpiece and a bottom surface which is positioned on the rear side of the working surface. The shape of the working surface is varied with a change of the shape of the bottom surface. The press member is pressed against the bottom surface of the mold, thereby changing the shape of the bottom surface as well as that of the working surface. The base, having a concave portion storing or receiving therein the press member, supports the mold. The driving mechanism drives the press member to be stored in or to project from the concave portion.

The aforementioned mold is preferably selectively provided with a slit, so that this mold is deformable. Further, the working surface is preferably formed by a curved surface. An upper surface of the press member preferably comes into contact with the overall bottom surface of the mold, while this upper surface of the press member is also formed by a curved surface.

As hereinabove described, the press working machine according to the present invention comprises the base having a concave portion and supporting the mold, the press member which is stored or received in the concave portion, and the driving mechanism for driving the press member. The press member is driven by the driving mechanism to project from or to be stored in the concave portion, and pressed against the bottom surface of the mold when the same projects from the concave portion. The mold can also be used in such a state that the press member is not pressed against its bottom surface. In this case, press working can be carried out along the original shape of the working surface of the mold. In order to carry out press working along a shape which is different from the original shape of the working surface of the mold, on the other hand, the press member is driven by the driving mechanism to project from the concave portion, and pressed against the bottom surface of the mold. Thus, the shape of the bottom surface as well as that of the working surface of the mold are changed. Press working is carried out along the deformed working surface. Consequently, it is possible to press-mold workpieces into a plurality of shapes with a single mold.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
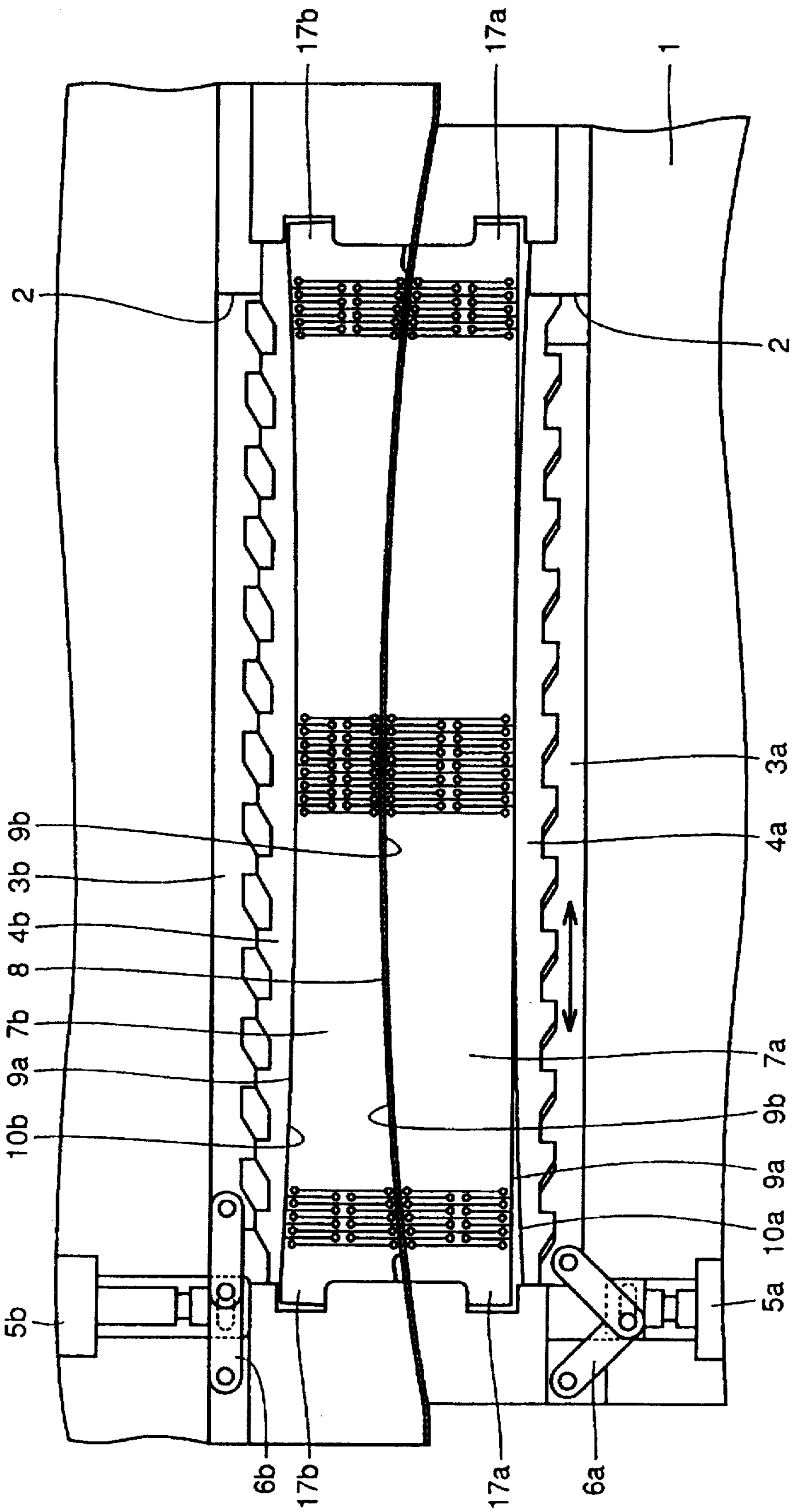
FIG. 1 is a partially fragmented side elevational view showing a press working machine according to the present invention.
Figure 2:
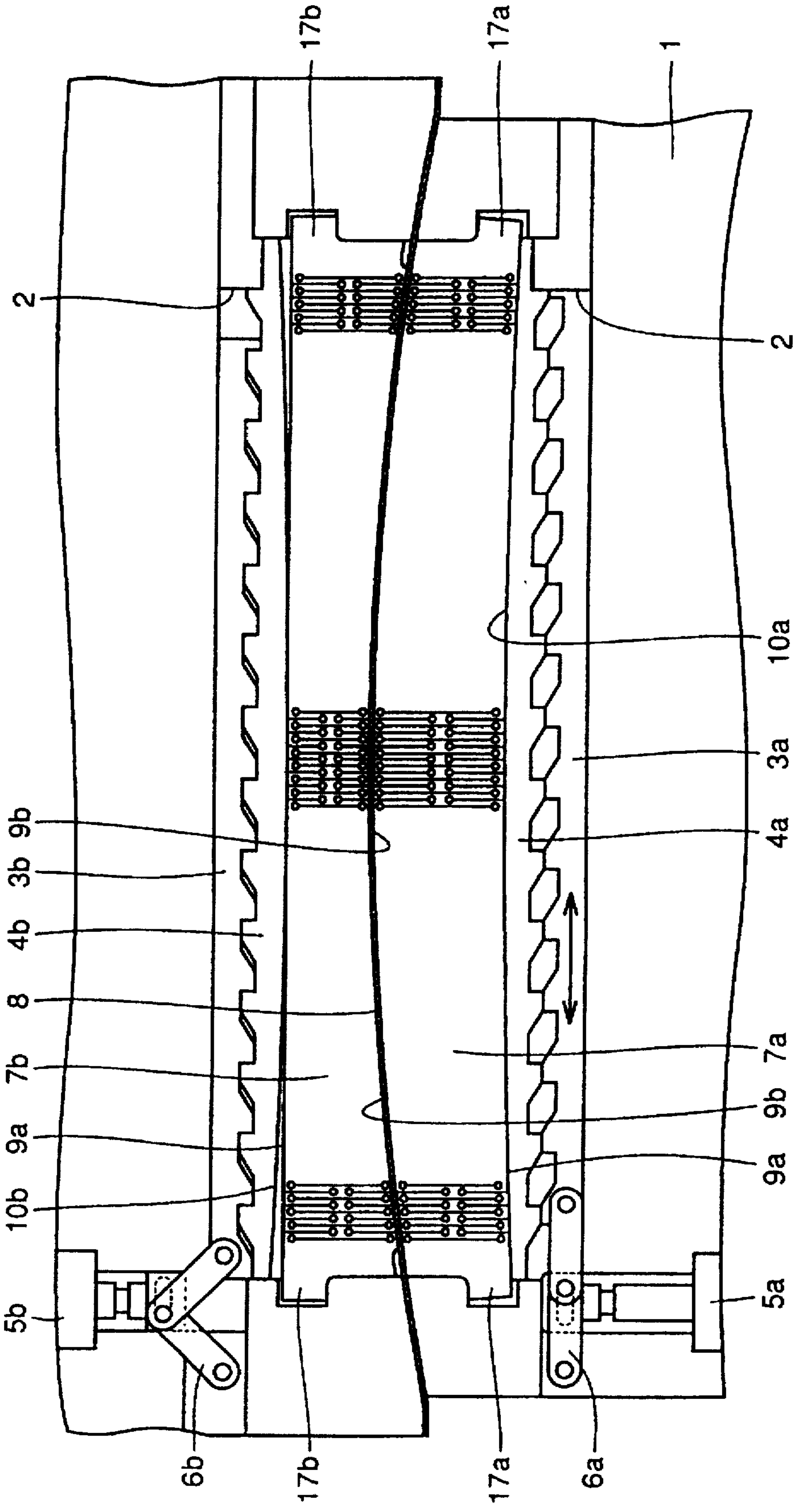
FIG. 2 is a partially fragmented side elevational view of the press working machine showing a mold which is deformed from the state shown in FIG. 1.

An embodiment of the present invention is now described with reference to FIGS. 1 to 5. FIGS. 1 and 2 are partially fragmented side elevational views showing a press working machine according to the present invention.

Referring to FIG. 1, the press working machine according to the present invention comprises bases 1, having concave portions 2, supporting deformable molds 7a and 7b. Slider members 3a and 3b are set in the concave portions 2. First ends of arms or linkages 6a and 6b are attached to first ends of the slider members 3a and 3b respectively. On the opposite second hand, the other ends of the arms 6a and 6b are attached to the bases 1 respectively. Cylinders 5a and 5b are connected to central portions of the arms or linkages 6a and 6b, for bending and stretching the arms or linkages 6a and 6b respectively.

Press members 4a and 4b are mounted on the slider members 3a and 3b respectively. In this case, an upper surface of the slider member 3a is irregularized (uneven), while a bottom surface of the press member 4a is also irregularized (uneven) so as to fit together with the irregularized upper surface of the slider member 3a. In a similar manner, a surface of the slider member 3b is also irregular or uneven, and a mating surface of the press member 4b is irregular or uneven in a fitting manner. The molds 7a and 7b are arranged on the press members 4a and 4b. The molds 7a and 7b are provided with engaging portions 17a and 17b, and supported by the bases 1 through the engaging portions 17*a* and 17*b* respectively. A workpiece 8 is arranged between the molds 7*a* and 7*b* and held by and between these molds 7*a* and 7*b* with wear plates or the like interposed therebetween, to be worked into a desired shape.

Working surfaces 9*b* of the molds 7*a* and 7*b* are formed by curved surfaces having prescribed curvatures in the embodiment shown in FIG. 1. Upper or mold-facing surfaces 10*a* and 10*b* of the press members 4*a* and 4*b* are also formed by curved surfaces having prescribed curvatures. The molds 7*a* and 7*b* are selectively provided with slits, for example, to be deformable themselves. When the upper surfaces 10*a* and 10*b* of the press members 4*a* and 4*b* are pressed against bottom surfaces 9*a* of the molds 7*a* and 7*b*, therefore, the working surfaces 9*b* of the molds 7*a* and 7*b* can be deformed. The molds 7*a* and 7*b* can press-mold the workpiece 8 also in a state leaving the working surfaces 9*b* in the original shapes, whereby it is possible to press-mold workpieces into a plurality of shapes by a single mold assembly including the molds 7*a* and 7*b*. Consequently, the manufacturing cost for the mold assembly can be reduced, while an operation for exchanging the mold assembly call be omitted. Thus, the manufacturing cost can be reduced.

With reference to FIGS. 1 and 2, characteristic operations of the press working machine according to the present invention, i.e., operations for deforming the working surfaces 9*b* of the molds 7*a* and 7*b* will now be described.

First, an operation for deforming the working surface 9*b* of the mold 7*a* shown in FIG. 1 is described. From the state shown in FIG. 1, the cylinder 5*a* is driven to extend the arm 6*a*. Consequently, the slider member 3*a* slides in the concave portion 2, to move toward the right in FIG. 1. Thus, ramp-like projections provided on the upper surface of the slider member 3*a* are brought into contact with similar projections provided on the bottom surface of the press member 4*a*. Consequently, the press member 4*a* is pushed upwardly so that it projects from the concave portion 2 of the base 1, so that the upper surface 10*a* of the press member 4*a* is pressed against the bottom surface 9*a* of the mold 7*a*. Thus, the shape of the working surface 9*b* of the mold 7*a* is changed.

On the other hand, an operation for deforming the working surface 9*b* of the mold 7*b* shown in FIG. 1 is now described. Referring again to FIG. 1, from the state shown, the cylinder 5*b* is driven to bend the arm 6*b*. Thus, the slider member 3*b* moves toward the left in FIG. 1, to bring concavities provided on the lower or mold-facing surface of the slider member 3*b* into alignment with projections provided on the top surface of the press member 4*b*. Consequently, the press member 4*b* is retracted to be stored or received in the concave portion 2 of the base 1, as shown in FIG. 2. Thus, the shape of the working surface 9*b* of the mold 7*b* is changed.

Figure 3:
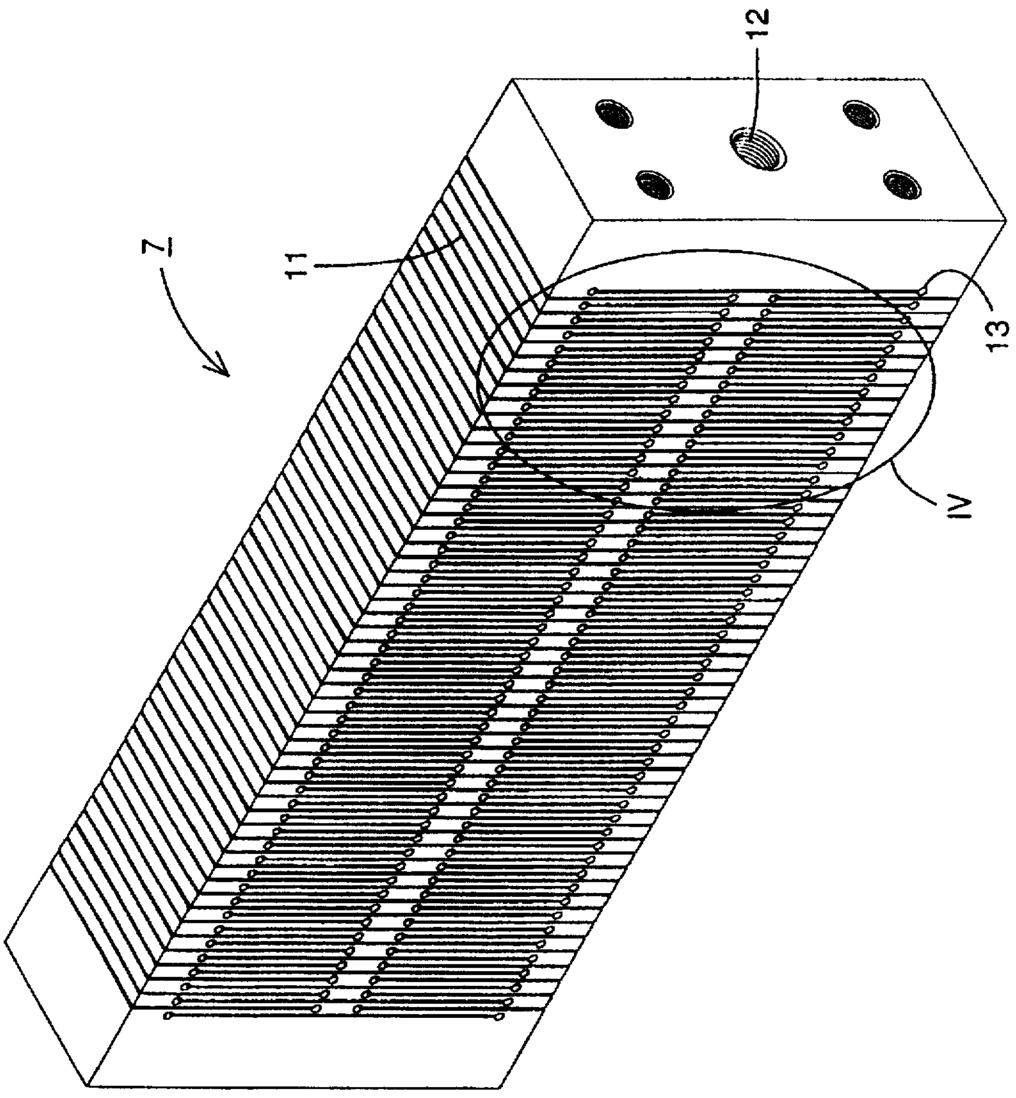
FIG. 3 is a perspective view showing an exemplary mold which is employable in the press working machine according to the present invention.
Figure 4:
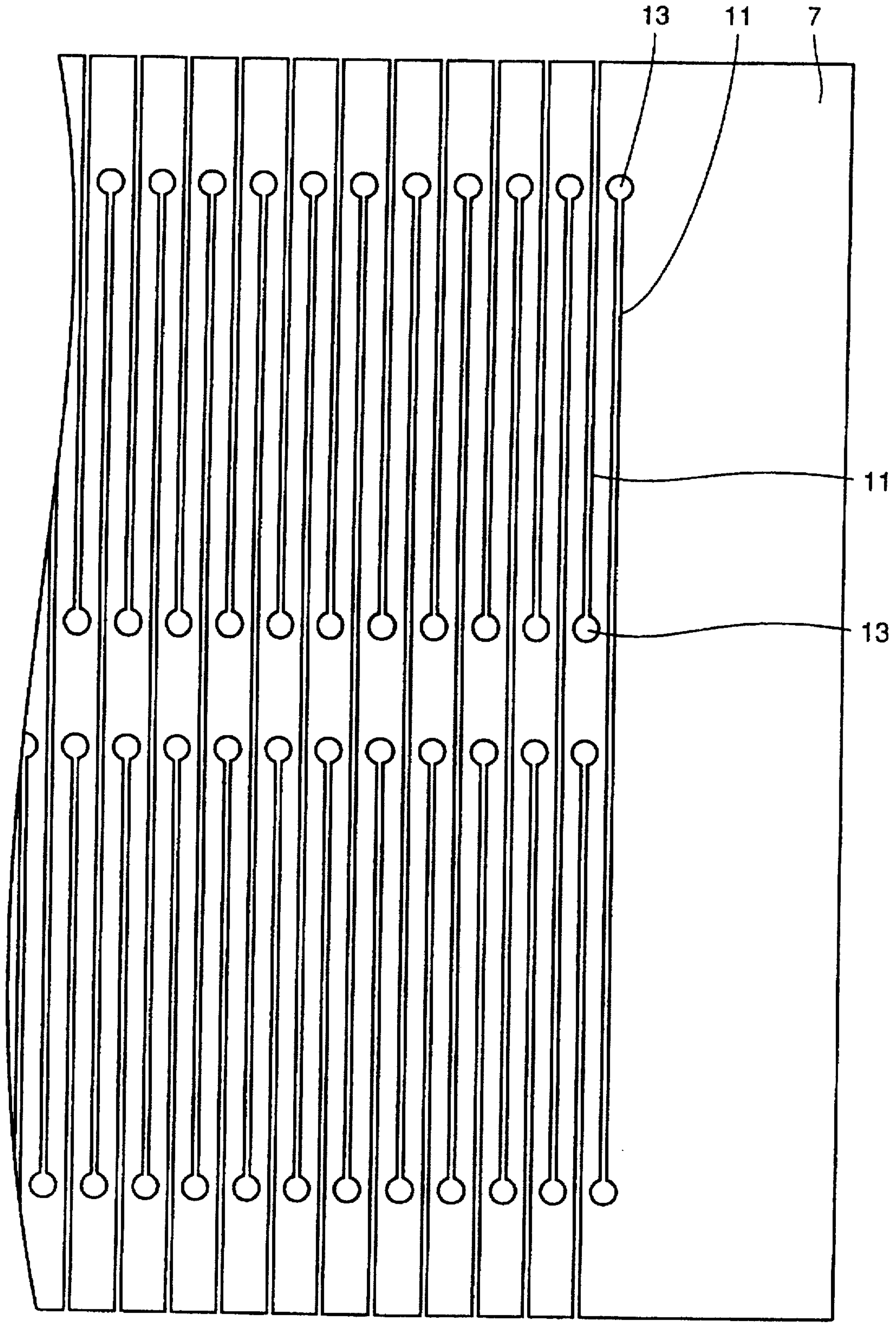
FIG. 4 is an enlarged view showing a region IV appearing in FIG. 3.
Figure 5:
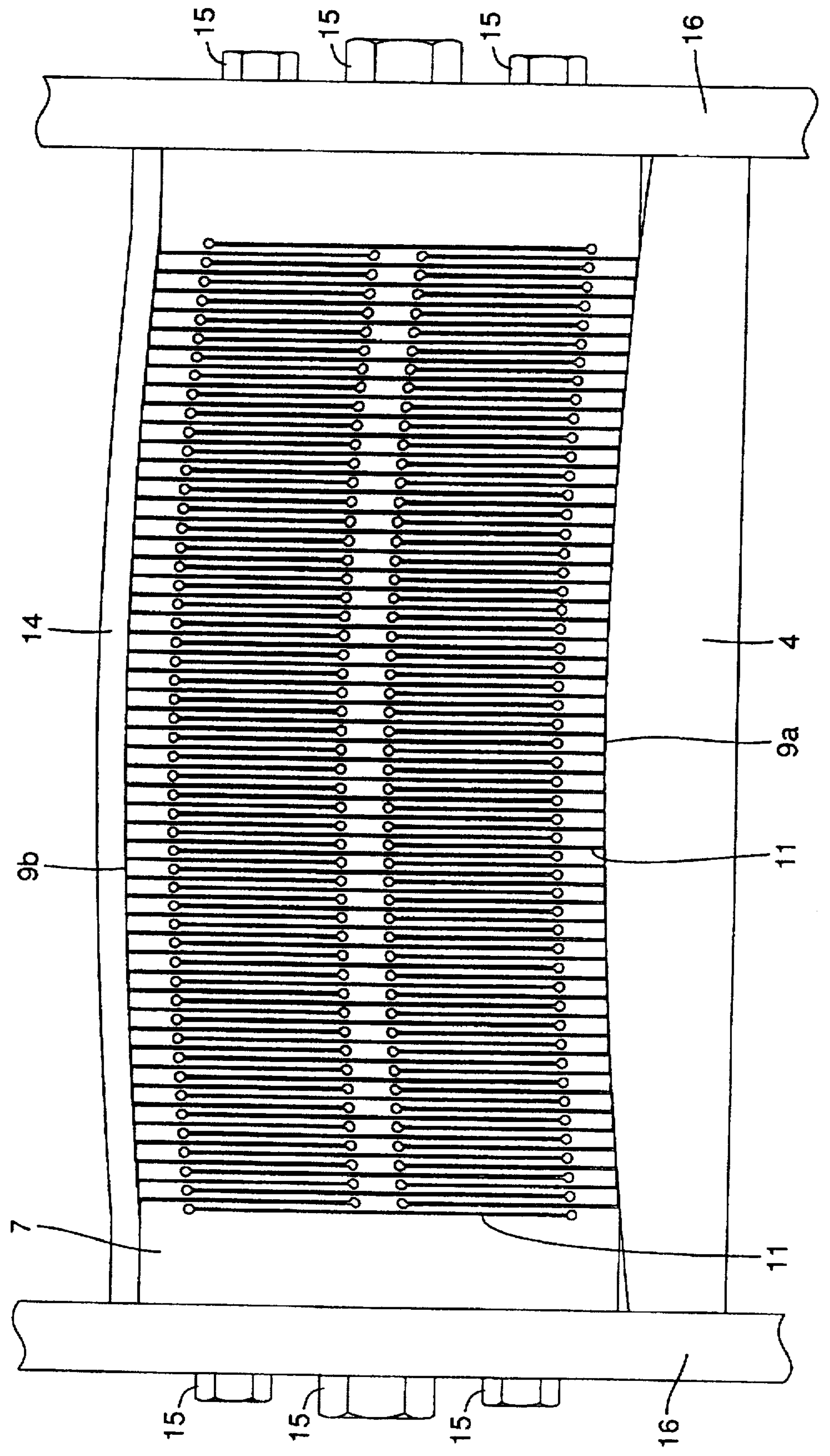
FIG. 5 is a plan view showing the mold of FIG. 3 being used in an exemplary state.

With reference to FIGS. 3 to 5, an exemplary mold 7 which is employable in the press working machine according to the present invention is now described. FIG. 3 is a perspective view showing the mold 7 which can be employed in the press working machine according to the present invention. FIG. 4 is an enlarged view showing a region IV appearing in FIG. 3. FIG. 5 is a plan view showing the mold 7 in a deformed state.

Referring to FIG. 3, the mold 7 is an integral structure and is selectively provided with slits 11. Due to provision of such slits 11, the mold 7 can be deformed. In the embodiment shown in FIG. 3, screw holes 12 are provided on both ends of the mold 7.

Referring to FIG. 3, the mold 7 is preferably alternately provided with slits 11 having both ends located in the interior of the mold 7 and slits reaching side surfaces of the mold 7. Further, holes 13 are preferably provided at end portions of these slits 11. These holes 13 are adapted to relax stress concentration at the end portions of the slits 11. Due to provision of such holes 13, it is possible to ensure strength of the mold 7 and avoid crack formation upon deformation of the mold. As especially shown if FIG. 4, the slits 11 preferably include an alternating sequence of slits with their ends within the body of the mold and pairs of slits extending inwardly into the body of the mold from opposite sides thereof.

Referring to FIG. 5, fixing members 16 are mounted on both end portions of the mold 7 by fastening members 15 such as bolts. A wear plate 14 is arranged to cover a working surface 9*b* of the mold 7. The working surface 9*b* of the mold 7 is pressed against a workpiece with the wear plate 14 interposed therebetween, to press-work the workpiece. On the other hand, a press member 4 is pressed against a bottom surface 9*a* of the mold 7. An upper surface of the press member 4 is a curved surface, so that it is possible to deform the working surface 9*b* of the mold 7 by pressing the press member 4 against the bottom surface 9*a*.

The mold 7 shown in FIGS. 3 to 5 is merely an exemplary mold which is employable in the inventive press working machine, and is not restricted to the particular embodiment shown. Alternatively, the mold 7 can be formed by stacking thin plates, for example. The method of deforming the mold 7 is not restricted to the above described method either. For example, it is also possible to deform the shape of the working surface 9*b* by selectively pressing the bottom surface 9*a* of the mold 7 with some means.

As hereinabove described, the press working machine according to the present invention has a function capable of deforming the mold. Therefore, it is possible to carry out a plurality of types of press-working operations with a single mold, by employing a deformable mold. Thus, it is possible to reduce the cost for manufacturing the mold, while omitting an operation for exchanging the mold. Consequently, the manufacturing cost can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A press working machine comprising:

a mold having a working surface for press-working a workpiece and a bottom surface on an opposite side of said mold relative to said working surface, wherein said mold is an integral structure having at least one slit provided selectively therein so that said mold is deformable and a shape of said working surface is variable together with that of said bottom surface;

a press member adapted to be pressed against said bottom surface of said mold thereby deforming said mold and changing the shape of said bottom surface as well as that of said working surface;

a base having a concave portion adapted to selectively receive therein said press member and supporting said mold; and a driving mechanism coupled to said press member for selectively driving said press member to be received in or to project from said concave portion to change the shape of said bottom surface as well as that of said working surface of said mold.

2. The press working machine in accordance with claim 1, wherein said working surface is a curved surface, and said press member has a curved upper surface that is in contact with said bottom surface of said mold.

3. The press working machine in accordance with claim 1, wherein said driving mechanism includes:

a slider member slidably arranged along said concave portion, an arm having a first end connected to said slider member and a second end connected to said base, said arm being bendable and extendable, and a cylinder connected to a central portion of said arm for selectively bending and extending said arm, and said press member has a bottom surface that is uneven and said slider member has an upper surface that is also uneven to be selectively fitted with said uneven bottom surface of said press member, such that said slider member sliding in said concave portion causes said press member to selectively project from or be received in said concave portion.

4. A press working machine comprising:

first and second molds having working surfaces for press-working a workpiece and back surfaces on opposite sides of said molds relative to said working surfaces, wherein said molds are each respectively an integral structure having at least one slit provided selectively therein so that said molds are deformable and respective shapes of said working surfaces are variable together with those of said back surfaces, and wherein said first and second molds are arranged with said working surfaces facing opposed to each other;

first and second press members adapted to be pressed against said back surfaces of said first and second molds respectively thereby deforming said molds and changing the shapes of said back surfaces as well as those of said working surfaces, wherein said first and second press members are arranged in positions opposite to each other;

first and second bases respectively having first and second concave portions arranged at opposite positions from one another, wherein said first and second concave portions are adapted to receive therein said first and second press members respectively and said first and second bases support said first and second molds respectively; and first and second driving mechanisms coupled to said first and second press members respectively for selectively driving said first and second press members to be received in or to project from said first and second concave portions respectively to change the shapes of said back surfaces as well as those of said working surfaces of said first and second molds respectively.

5. The press working machine in accordance with claim 2, wherein said curved upper surface of said press member is adapted to be brought selectively either partially or entirely into contact with said bottom surface of said mold.

6. The press working machine in accordance with claim 3, wherein said uneven bottom surface of said press member has first ramp-shaped projections with gaps therebetween, and said uneven upper surface of said slider member has second ramp-shaped projections arranged and adapted to selectively mesh into said gaps and mesh onto said first ramp-shaped projections.

7. The press working machine in accordance with claim 1, wherein said mold has a plurality of said slits therein extending substantially parallel to one another in a direction extending between said working surface and said bottom surface.

8. The press working machine in accordance with claim 7, wherein said direction of said slits is substantially perpendicular to said bottom surface of said mold.

9. The press working machine in accordance with claim 7, wherein said slits respectively do not extend completely from said working surface to said bottom surface.

10. The press working machine in accordance with claim 7, wherein said slits include first slits that extend from said working surface or said bottom surface toward and not completely to an opposite one of said bottom surface or said working surface, and second slits that respectively extend within a body of said mold without reaching said bottom surface or said working surface.

11. The press working machine in accordance with claim 10, wherein said first slits are arranged respectively alternating with said second slits.

12. The press working machine in accordance with claim 3, wherein said arm comprises two arm links articulately connected together at said central portion of said arm.

13. A press working machine comprising:

a mold having a slit selectively provided therein rendering the mold deformable, and having a curved working surface for press-working a workpiece and a back surface on a side of said mold opposite said working surface, wherein a shape of said working surface and a shape of said back surface are variable together with each other;

a press member having a curved press surface that is in contact with and adapted to be pressed against said back surface of said mold thereby deforming said mold and changing said shape of said back surface as well as said shape of said working surface;

a base having a concave portion adapted to selectively receive therein said press member, and supporting said mold; and a driving mechanism coupled to said press member for selectively driving said press member to be received in or to project from said concave portion to change said shape of said back surface as well as said shape of said working surface of said mold.

14. The press working machine in accordance with claim 13, wherein said curved press surface of said press member is adapted to be brought selectively either partially or entirely into contact with said back surface of said mold.

15. The press working machine in accordance with claim 13, wherein said mold has a plurality of said slits therein extending substantially parallel to one another in a direction extending between said working surface and said back surface, and wherein said slits respectively do not extend completely from said working surface to said back surface.

16. The press working machine in accordance with claim 15, wherein said slits include first slits that extend from said working surface or said back surface toward and not completely to an opposite one of said back surface or said working surface, and second slits that respectively extend within a body of said mold without reaching said back surface or said working surface.

17. The press working machine in accordance with claim 16, wherein said first slits are arranged respectively alternating with said second slits.

18. A press working machine comprising:

a mold having a working surface for press-working a workpiece and a back surface on a side of said mold opposite said working surface, wherein a shape of said working surface and a shape of said back surface are variable together with each other;

a press member having a press surface adapted to be pressed against said back surface of said mold thereby deforming said mold and changing said shape of said back surface as well as said shape of said working surface;

a base having a concave portion adapted to selectively receive therein said press member, and supporting said mold; and a driving mechanism coupled to said press member for selectively driving said press member to be received in or to project from said concave portion to change said shape of said back surface as well as said shape of said working surface of said mold, wherein said driving mechanism includes:

a slider member slidably arranged along said concave portion, an arm having a first end connected to said slider member and a second end connected to said base, said arm being bendable and extendable, and a cylinder connected to a central portion of said arm for selectively bending and extending said arm, and wherein said press member has, opposite said press surface, a back surface that is uneven, and said slider member has a surface that is also uneven to be selectively fitted with said uneven back surface of said press member, such that said slider member sliding in said concave portion causes said press member to selectively project from or be received in said concave portion.

19. The press working machine in accordance with claim 18, wherein said uneven back surface of said press member has first ramp-shaped projections with gaps therebetween, and said uneven surface of said slider member has second ramp-shaped projections arranged and adapted to selectively mesh into said gaps and mesh onto said first ramp-shaped projections.

20. The press working machine in accordance with claim 18, wherein said arm comprises two arm links articulately connected together at said central portion of said arm.

* * * * *